United States Patent
Kanno (10) Patent No.: US 11,756,325 B2
(45) Date of Patent: Sep. 12, 2023

(54) VEHICLE EXTERIOR ENVIRONMENT RECOGNITION APPARATUS

(71) Applicant: SUBARU CORPORATION, Tokyo (JP)

(72) Inventor: Aito Kanno, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 316 days.

(21) Appl. No.: 17/060,371

(22) Filed: Oct. 1, 2020

(65) Prior Publication Data
US 2021/0158060 A1 May 27, 2021

(30) Foreign Application Priority Data
Nov. 22, 2019 (JP) ................. 2019-210983

(51) Int. Cl.
| | |
|---|---|
| *G06K 9/00* | (2022.01) |
| *G06V 40/10* | (2022.01) |
| *G05D 1/02* | (2020.01) |
| *G06V 20/58* | (2022.01) |
| *G06V 10/25* | (2022.01) |
| *G06F 18/22* | (2023.01) |

(52) U.S. Cl.
CPC ......... *G06V 40/103* (2022.01); *G05D 1/0251* (2013.01); *G06F 18/22* (2023.01); *G06V 10/25* (2022.01); *G06V 20/58* (2022.01)

(58) Field of Classification Search
CPC ...... G06V 20/58; G06V 10/25; G06V 10/267; G06V 40/103; G05D 1/0251; G06K 9/6201; G06K 9/6215
See application file for complete search history.

(56) References Cited

U.S. PATENT DOCUMENTS

| | | | |
|---|---|---|---|
| 10,157,476 B1* | 12/2018 | Idrisov | H04L 67/1061 |
| 10,436,898 B2* | 10/2019 | Kurata | G01S 17/86 |
| 10,685,449 B2* | 6/2020 | Takemura | B60R 1/00 |
| 2020/0327690 A1* | 10/2020 | Cai | G06V 20/58 |

FOREIGN PATENT DOCUMENTS

| | | | | |
|---|---|---|---|---|
| EP | 3996066 A1 * | 5/2022 | | |
| JP | 3349060 B2 | 11/2002 | | |
| JP | 2008-134877 A | 6/2008 | | |
| JP | 2013232080 A * | 11/2013 | | G06K 9/00805 |
| JP | 5648655 B2 * | 1/2015 | | G06K 9/00805 |
| WO | WO-2021006025 A1 * | 1/2021 | | |

* cited by examiner

*Primary Examiner* — Emily C Terrell
*Assistant Examiner* — Ahmed A Nasher
(74) *Attorney, Agent, or Firm* — McDermott Will & Emery LLP (57) ABSTRACT

A vehicle exterior environment recognition apparatus includes a three-dimensional object region identification unit, a bicycle determination unit, and a bicycle identification unit. The three-dimensional object region identification unit identifies a three-dimensional object region including a three-dimensional object, in an image. The bicycle determination unit divides the three-dimensional object region into a plurality of divisions, to determine bicycle-likeliness of the three-dimensional object on the basis of a state of occupation of each of the plurality of the divisions by the three-dimensional object. The bicycle identification unit identifies the three-dimensional object as a bicycle on the basis of the bicycle-likeliness.

9 Claims, 7 Drawing Sheets

VEHICLE EXTERIOR ENVIRONMENT RECOGNITION APPARATUS

CROSS-REFERENCE TO RELATED APPLICATIONS

This application claims priority from Japanese Patent Application No. 2019-210983 filed on Nov. 22, 2019, the entire contents of which are hereby incorporated by reference.

BACKGROUND

The disclosure relates to a vehicle exterior environment recognition apparatus that identifies a specific object present in a traveling direction of an own vehicle.

Techniques have been known that include detecting three-dimensional objects, e.g., vehicles, ahead of an own vehicle and making a collision avoidance control and/or a cruise control. The collision avoidance control includes avoiding a collision with a preceding vehicle. The cruise control includes keeping a safe distance to the preceding vehicle. For example, reference is made to Japanese Patent No. 3349060.

As a technique of detecting three-dimensional objects, a technique has been disclosed that includes referring to an image pattern captured sideways of an own vehicle, to detect a parallel traveling vehicle on the basis of edge symmetry in a longitudinal direction of the own vehicle. A parallel traveling vehicle means a vehicle traveling in parallel to the own vehicle. For example, reference is made to Japanese Unexamined Patent Application Publication (JP-A) No. 2008-134877.

SUMMARY

An aspect of the technology provides a vehicle exterior environment recognition apparatus including a three-dimensional object region identification unit, a bicycle determination unit, and a bicycle identification unit. The three-dimensional object region identification unit is configured to identify a three-dimensional object region in an image. The three-dimensional object region includes a three-dimensional object. The bicycle determination unit is configured to divide the three-dimensional object region into a plurality of divisions, to determine bicycle-likeliness of the three-dimensional object on the basis of a state of occupation of each of the plurality of the divisions by the three-dimensional object. The bicycle identification unit is configured to identify the three-dimensional object as a bicycle on the basis of the bicycle-likeliness.

An aspect of the technology provides a vehicle exterior environment recognition apparatus including circuitry. The circuitry is configured to identify a three-dimensional object region in an image. The three-dimensional object region includes a three-dimensional object. The circuitry is configured to divide the three-dimensional object region into a plurality of divisions, to determine bicycle-likeliness of the three-dimensional object on the basis of a state of occupation of each of the plurality of the divisions by the three-dimensional object. The circuitry is configured to identify the three-dimensional object as a bicycle on the basis of the bicycle-likeliness.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Non-limiting examples of a specific object present in a traveling direction of an own vehicle may include a preceding vehicle that travels in a same direction, and objects such as a pedestrian and a bicycle that cross a traveling path in a lateral direction of the own vehicle. Regarding the objects such as the pedestrian and the bicycle that cross the traveling path, it is desirable to determine their pedestrian-likeliness or bicycle-likeliness, on the basis of their outlines. The bicycle, however, generally crosses faster than the pedestrian does. If a collision avoidance control is postponed until confirmation of the entire outline of the bicycle, a distance from the own vehicle to the bicycle may become short during the postponement. This may necessitate an abrupt action as a collision avoidance control. A possible way to identify the bicycle itself earlier may be to identify a front wheel or a circular shape as a part of a bicycle by, for example, Hough transform.

However, there are various three-dimensional objects in the traveling direction of the own vehicle. Some three-dimensional objects may have shapes and surface coloring similar to a wheel. Identifying something as a bicycle solely with the clue of a front wheel may cause possibility of erroneous detection of a three-dimensional object that looks like a wheel, as a front wheel.

It is desirable to provide a vehicle exterior environment recognition apparatus that makes it possible to promptly and accurately identify a specific object such as a bicycle.

In the following, some preferred but non-limiting embodiments of the disclosure are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, a dimension of each of the elements, a material of each of the elements, a ratio between the elements, relative positional relationship between the elements, and any other specific numerical value are illustrative only for easier understanding and not to be construed as limiting to the technology unless otherwise stated. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

(Vehicle Exterior Environment Recognition System 100)

Figure 1:
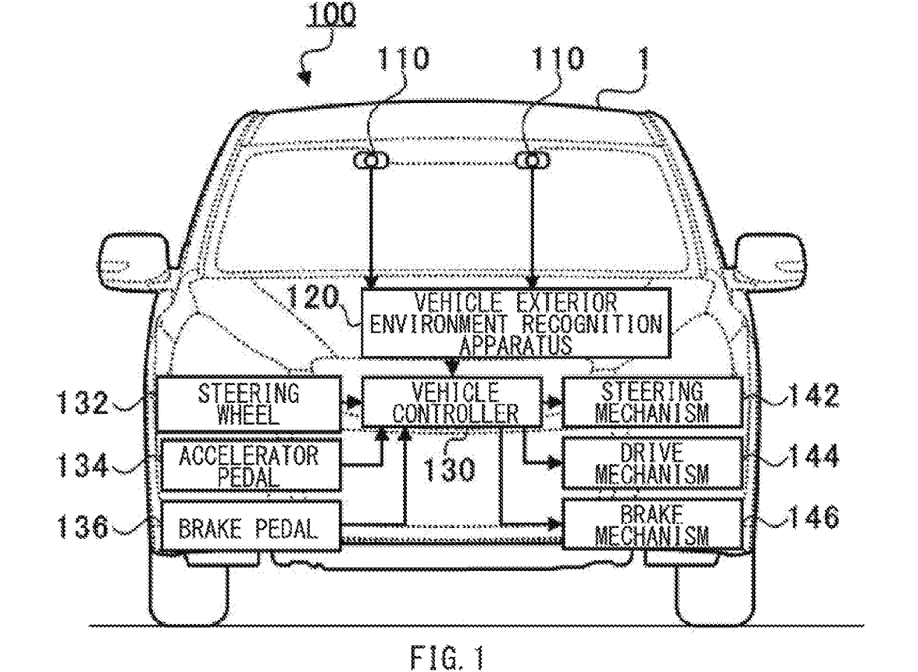
FIG. 1 is a block diagram illustrating a relation of connection in a vehicle exterior environment recognition system.

FIG. 1 is a block diagram illustrating a relation of connection in a vehicle exterior environment recognition system 100. The vehicle exterior environment recognition system 100 may include image-capturing units 110, a vehicle exterior environment recognition apparatus 120, and a vehicle controller 130. The vehicle controller 130 may include, for example, an electronic control unit (ECU). The embodiment may include an example with the two image-capturing units 110 without limitation.

The image-capturing units 110 may each include an imaging device such as, but not limited to, a charge-coupled device (CCD) and a complementary metal-oxide semiconductor (CMOS). The image-capturing units 110 may each capture an image of vehicle exterior environment ahead of an own vehicle 1, and generate a luminance image. The luminance image may include at least luminance information, and be provided in the form of a color image or a monochrome image. The two image-capturing units 110 may be so disposed that their respective optical axes become substantially parallel to each other along a traveling direction of the own vehicle 1. The two image-capturing units 110 may be so disposed as to be separated away from each other in a substantially horizontal direction. The image-capturing units 110 may continuously generate the luminance image for each frame of, for example but not limited to, 1/60 second (at a frame rate of 60 fps). The luminance image may include a capture of a three-dimensional object present in a detection region ahead of the own vehicle 1. Here, the three-dimensional object to be recognized by the image-capturing units 110 refers to an object that is present independently, as well as an object identifiable as a part of the independently present object. Non-limiting examples of the independently present three-dimensional object may include a bicycle, a pedestrian, a vehicle, a traffic light, a road or a traveling path, a road sign, a guardrail, and a building. Non-limiting examples of the object identifiable as a part of the independently present object may include a wheel of a bicycle.

The vehicle exterior environment recognition apparatus 120 may acquire the luminance image from each of the two image-capturing units 110, to derive parallax information with the use of so-called pattern matching. The parallax information may include parallax and an image position. The image position indicates where any block is positioned in an image. Here, a block is represented by, for example, an array of 4 pixels horizontally by 4 pixels vertically. The term horizontally refers to a transverse direction in an image captured. The term vertically refers to a longitudinal direction in the image captured. The pattern matching includes searching one of the luminance images for a block corresponding to a block extracted from the other of the luminance images. The pattern matching may possibly include comparing a pair of images with respect to luminance (Y) in units of blocks. Non-limiting examples may include techniques such as, but not limited to, SAD (Sum of Absolute Difference), SSD (Sum of Squared intensity Difference), and NCC (Normalized Cross Correlation). The SAD includes obtaining a difference in the luminance. The SSD includes using the difference squared. The NCC includes obtaining a degree of similarity of a variance obtained by subtracting an average from luminance of each pixel. The vehicle exterior environment recognition apparatus 120 may perform such parallax derivation processing in units of blocks with respect to all blocks displayed in the detection region of, for example, 600 pixels by 200 pixels. Here, each block is assumed to include 4 pixels by 4 pixels, but the number of pixels in each block may be set at any value.

The vehicle exterior environment recognition apparatus 120 is configured to derive the parallax with respect to each block as a unit of resolution of detection, but is not configured to recognize what three-dimensional object the relevant block is a part of. It follows, therefore, that the parallax information is derived not in units of three-dimensional objects but in units of the resolution of detection. For example, the parallax information is derived independently in units of blocks in the detection region. Here, an image to which the parallax information thus derived is correlated is referred to as a distance image, separately from the luminance image described above.

Figure 2A:
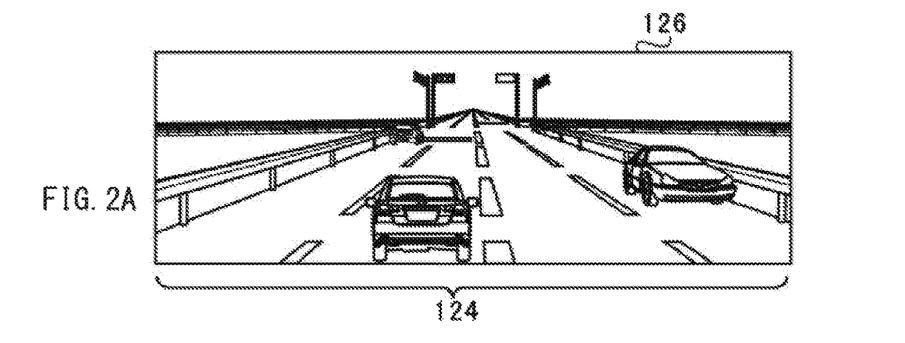
FIG. 2A describes an example of a luminance image.
Figure 2B:
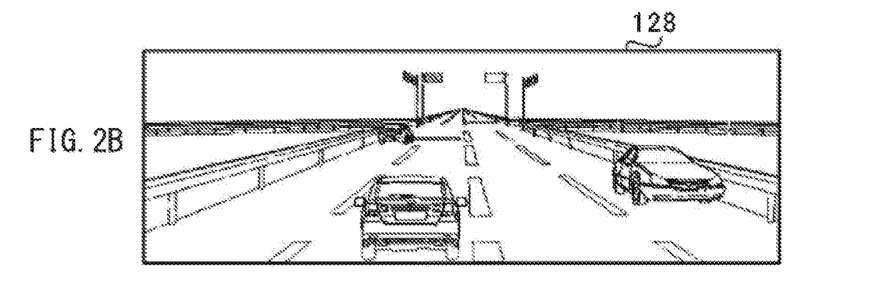
FIG. 2B describes an example of a distance image.

FIG. 2A illustrates an example of a luminance image 126. FIG. 2B illustrates an example of a distance image 128. For example, let us assume that the luminance images 126 as illustrated in FIG. 2A are generated with respect to a detection region 124 through the two image-capturing units 110. Note that FIG. 2A schematically illustrates one of the two luminance images 126 for easier understanding. The vehicle exterior environment recognition apparatus 120 may obtain the parallax in units of blocks from the luminance image 126, to form the distance image 128 as illustrated in FIG. 2B. With each block in the distance image 128, the parallax information regarding the relevant block is associated. In FIG. 2B, for purposes of description, the block with respect to which the parallax is derived is represented by a black dot.

The vehicle exterior environment recognition apparatus 120 may perform grouping of blocks, as a target object. The grouping may be made with the use of luminance values, i.e., color values, based on the luminance image 126 and with the use of three-dimensional positional information in real space. The positional information may be calculated on the basis of the distance image 128, and include a relative distance to the own vehicle 1. The blocks to be grouped may have equal color values, and have the positional information indicating that the blocks are close to one another in the three-dimensional positional space. Thereafter, the vehicle exterior environment recognition apparatus 120 may identify what kind of specific object, e.g., a preceding vehicle or a bicycle, the target object in the detection region ahead of the own vehicle 1 corresponds to. Identifying the three-dimensional object in this way, the vehicle exterior environment recognition apparatus 120 may control the own vehicle 1 to perform a collision avoidance control and/or a cruise control. The collision avoidance control includes avoiding a collision with the three-dimensional object. The cruise control includes maintaining a safe distance to a preceding vehicle. It is to be noted that the relative distance as mentioned above may be obtained by converting the parallax information in units of blocks in the distance image 128 into the three-dimensional positional information with the use of a so-called stereo method. Here, the stereo method is a method of deriving, from the parallax of a target object, a relative distance to the image-capturing units 110 of the relevant target object with the use of triangulation.

The vehicle controller 130 may receive an input of the driver's operation through a steering wheel 132, an accelerator pedal 134, and a brake pedal 136, and transmit the input to a steering mechanism 142, a drive mechanism 144, and a brake mechanism 146, to control the own vehicle 1. The vehicle controller 130 may control the steering mechanism 142, the drive mechanism 144, and the brake mechanism 146 in accordance with an instruction from the vehicle exterior environment recognition apparatus 120.

As mentioned above, in the vehicle exterior environment recognition system 100, objects such as a pedestrian and a bicycle that cross the traveling path in the lateral direction of the own vehicle are identified. Regarding the objects such as the pedestrian and the bicycle that cross the traveling path, it is desirable to determine their pedestrian-likeliness or bicycle-likeliness, on the basis of their entire outlines. While the pedestrian crosses slowly, the bicycle crosses faster than the pedestrian does. If a collision avoidance control is postponed until confirmation of the entire outline of the bicycle, a distance from the own vehicle 1 to the bicycle may become short during the postponement. This may necessitate an abrupt action as the collision avoidance control.

Accordingly, in a case where the bicycle enters the luminance image from outside the luminance image, it is desirable to promptly recognize bicycle-possibility at timing of grasping a part of the bicycle, and to enhance responsiveness. However, identifying something as a bicycle solely with the clue of a front wheel, or one of the wheels, may cause possibility of erroneous detection of a three-dimensional object having a shape or surface coloring that looks like a wheel, as a front wheel of a bicycle.

In this embodiment, a three-dimensional object may be identified as a bicycle at timing when not only a front wheel of a bicycle but also a rider of the bicycle, or a person who is riding the bicycle, are included in the image. Hence, it is possible to provide both responsiveness and accuracy.

In the following, a configuration of the vehicle exterior environment recognition apparatus 120 is described in detail. Here, an identification process of a three-dimensional object, e.g., a bicycle, in the detection region ahead of the own vehicle 1 according to the embodiment is described in detail, and description of a configuration irrelevant to the embodiment is omitted.

(Vehicle Exterior Environment Recognition Apparatus 120)

Figure 3:
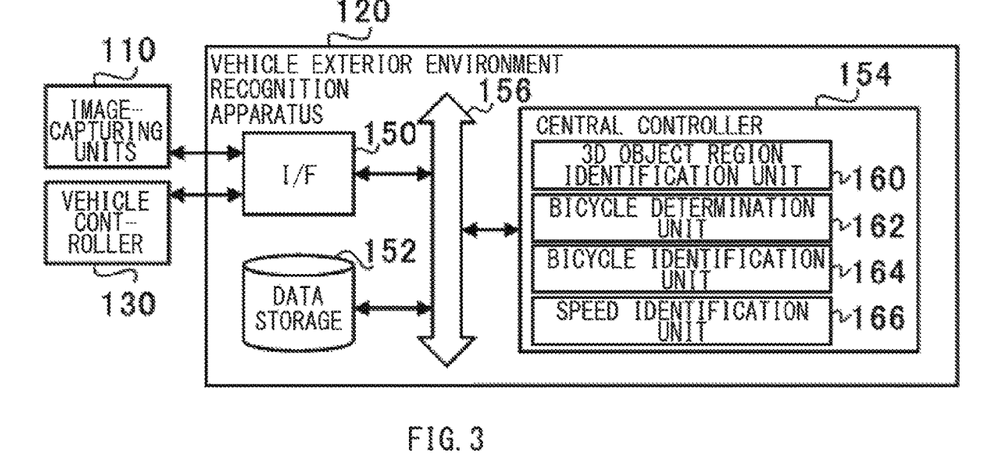
FIG. 3 is a block diagram illustrating, in outline, subunits of a vehicle exterior environment recognition apparatus.

FIG. 3 is a block diagram illustrating, in outline, subunits of the vehicle exterior environment recognition apparatus 120. As illustrated in FIG. 3, the vehicle exterior environment recognition apparatus 120 may include an I/F 150, a data storage 152, and a central controller 154.

The I/F 150 is an interface that carries out bi-directional information exchange with the image-capturing units 110 and the vehicle controller 130. The data storage 152 may include, for example, a RAM (Random Access Memory), a flash memory, and an HDD (Hard Disk Drive), and hold various pieces of information involved in processing by the subunits described below.

The central controller 154 may include a semiconductor integrated circuit including, for example, a CPU (Central Processing Unit), a ROM (Read Only Memory), and a RAM. The ROM may hold, for example, programs. The RAM may serve as a work area. The central controller 154 may control, for example, the I/F 150 and the data storage 152 through a system bus 156. In the embodiment, the central controller 154 may include a three-dimensional object region identification unit 160, a bicycle determination unit 162, a bicycle identification unit 164, and a speed identification unit 166. In the following, vehicle exterior environment recognition processing including bicycle identification according to the embodiment is described in detail, together with operation of the subunits of the central controller 154.

(Vehicle Exterior Environment Recognition Processing)

Figure 4:
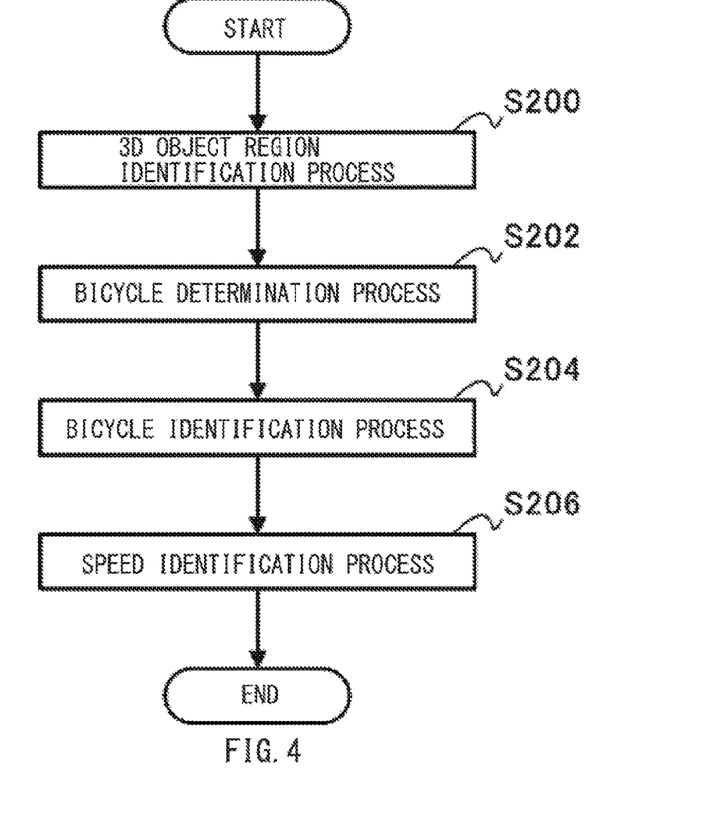
FIG. 4 is a flowchart illustrating a flow of vehicle exterior environment recognition processing.

FIG. 4 is a flowchart illustrating a flow of the vehicle exterior environment recognition processing. In the vehicle exterior environment recognition processing, first, the three-dimensional object region identification unit 160 may identify, in an image, a three-dimensional object region that includes a three-dimensional object (three-dimensional object region identification process S200). Thereafter, the bicycle determination unit 162 may divide the three-dimensional object region into a plurality of vertically arranged divisions, to determine bicycle-likeliness of the three-dimensional object on the basis of a state of occupation of each of the plurality of divisions by the three-dimensional object (bicycle determination process S202). Thereafter, the bicycle identification unit 164 may identify the three-dimensional object as a bicycle on the basis of the bicycle-likeliness (bicycle identification process S204). Thereafter, the speed identification unit 166 may identify a speed of the three-dimensional object on the basis of the state of occupation of each of the divisions by the three-dimensional object (speed identification process S206). In the following, each process is described in detail.

(Three-Dimensional Object Region Identification Process S200)

First, the three-dimensional object region identification unit 160 may perform grouping of blocks, in the distance image 128. The blocks to be grouped may include whichever blocks have the equal relative distance to the own vehicle 1 and are vertically and horizontally close to one another, out of a plurality of blocks located in a heightwise range of a predetermined distance or greater from a road surface. Thus, the three-dimensional object region identification unit 160 may identify the grouped blocks, as a three-dimensional object, or a presumed bicycle. Thereafter, the three-dimensional object region identification unit 160 may identify, as a three-dimensional object region 212, a rectangle region that includes all the three-dimensional objects thus identified. Here, a rectangle is formed by two vertically extending lines in contact with left and right edges of the three-dimensional object and two horizontally extending lines in contact with upper and lower edges of the three-dimensional object.

FIGS. 5A to 5D illustrate an example of the three-dimensional object region 212. For example, as illustrated in FIGS. 5A to 5D, let us assume a case where a bicycle is crossing, or moving, horizontally leftward ahead of the own vehicle 1. At timing of FIG. 5A, the bicycle is not recognized, and therefore, no three-dimensional object 210 is present in the luminance image 126. Thus, at this timing, no three-dimensional object region 212 is formed.

Figure 5A:
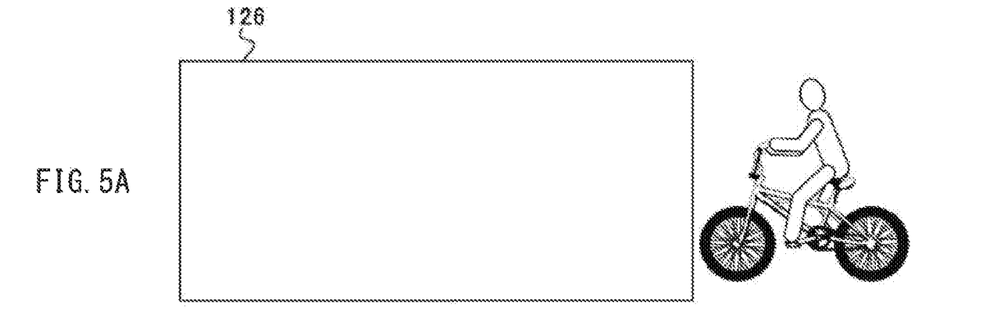
FIGS. 5A to 5D describe an example of a three-dimensional object region.
Figure 5B:
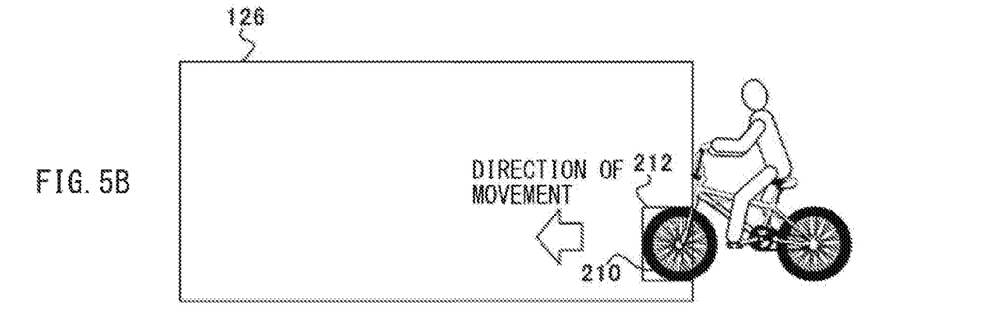
Figure 5C:
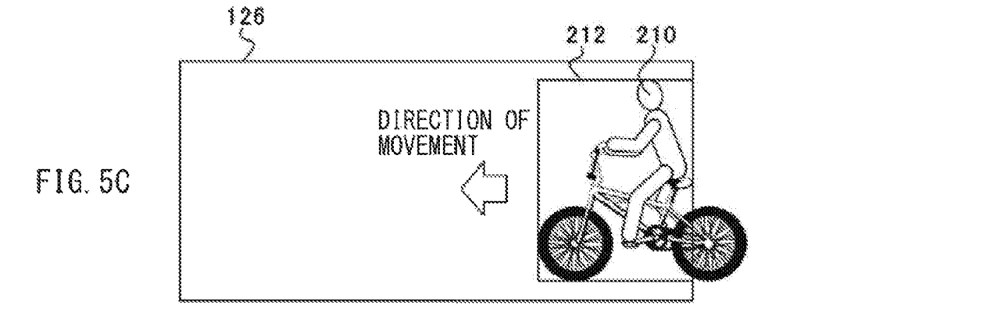
Figure 5D:
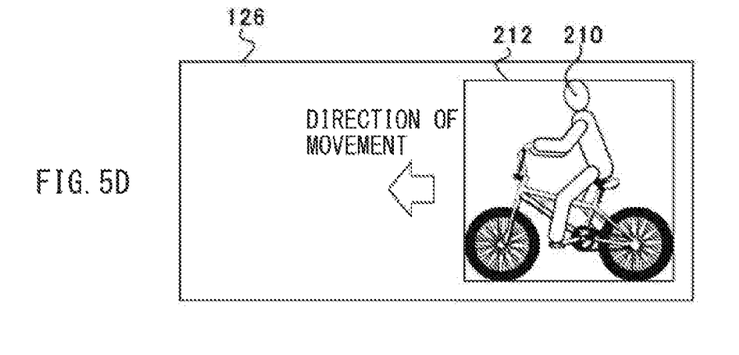

At timing after an elapse of predetermined time, as illustrated in FIG. 5B, a front wheel as a part of the bicycle is included as the three-dimensional object 210 in the luminance image 126. Thus, the three-dimensional object region identification unit 160 may identify the rectangle three-dimensional object region 212 including the three-dimensional object 210 as mentioned above. At timing after another elapse of predetermined time, as illustrated in FIG. 5C, the front wheel as the part of the bicycle and a rider of the bicycle are included as the three-dimensional object 210 in the luminance image 126. Thus, the three-dimensional object region identification unit 160 may identify the rectangle three-dimensional object region 212 including the three-dimensional object 210 as mentioned above. At timing after still another elapse of predetermined time, as illustrated in FIG. 5D, an entirety of the bicycle and the rider of the bicycle are included as the three-dimensional object 210 in the luminance image 126. Thus, the three-dimensional object region identification unit 160 may identify the rectangle three-dimensional object region 212 including the three-dimensional object 210 as mentioned above.

As illustrated in FIGS. 5A to 5D, in a case where the three-dimensional object 210 is positioned on the right in the luminance image 126, and area of occupation of the luminance image 126 by the three-dimensional object 210 becomes greater as time passes, a direction of movement is horizontally leftward. In a case where the three-dimensional object 210 is positioned on the left in the luminance image 126, and the area of occupation of the luminance image 126 by the three-dimensional object 210 becomes greater as time passes, the direction of movement is horizontally rightward.

(Bicycle Determination Process S202)

As described, in the embodiment, as illustrated in FIG. 5B, the front wheel, i.e., one of two wheels, being included in the luminance image 126 may not lead to a determination that the three-dimensional object 210 is a bicycle. As illustrated in FIG. 5C, at timing when the front wheel and the rider, i.e., the person riding the bicycle, are included in the luminance image 126, the front wheel and the rider of the bicycle, exclusive of a rear wheel, may be identified, to determine the bicycle-likeliness. Hence, it is possible to avoid erroneous bicycle detection, leading to precision, or accuracy, of identification.

The determination that the three-dimensional object 210 is a bicycle may be made, before the entirety of the bicycle is included in the luminance image 126 as illustrated in FIG. 5D. In other words, the determination that the three-dimensional object 210 is a bicycle may be made, at the timing when the front wheel and the rider of the bicycle are included in the luminance image 126. Hence, it is possible to enhance responsiveness.

Thus, the bicycle determination unit 162 may determine whether the three-dimensional object 210 as illustrated in FIG. 5C corresponds to the front wheel and the rider. First, the bicycle determination unit 162 may determine whether or not the three-dimensional object region 212 identified satisfies preconditions for being a bicycle. In a case where the three-dimensional object region 212 that satisfies the preconditions further satisfies conditions for the bicycle-likeliness, i.e., conditions of accumulation, the bicycle determination unit 162 may accumulate points of the bicycle-likeliness, to synthetically determine the bicycle-likeliness.

In one example, the bicycle determination unit 162 may determine, as a first precondition (1), whether or not the relative distance of the three-dimensional object region 212 is equal to or smaller than 30 meters. In a case with the relative distance of 30 meters or smaller, the bicycle determination unit 162 may keep the three-dimensional object region 212 as the presumed bicycle. One reason for this may be as follows. Low resolution in a range of the relative distance greater than 30 meters makes it difficult to determine whether or not the three-dimensional object 210 in this range is a bicycle. Moreover, the possibility is low that their behavior influences the own vehicle 1.

Thereafter, the bicycle determination unit 162 may determine, as a second precondition (2), whether or not a size of the three-dimensional object region 212 is equal to or greater than 1 meter horizontally and 1 meter vertically. In a case where the size of the three-dimensional object region 212 is equal to or greater than 1 meter horizontally and 1 meter vertically, the bicycle determination unit 162 may keep the three-dimensional object region 212 as the presumed bicycle. One reason for this may be to exclude, from the presumed bicycle, the three-dimensional object 210 smaller than a general bicycle.

Thereafter, the bicycle determination unit 162 may determine, as a third precondition (3), whether or not a height of the three-dimensional object region 212 from the road surface is equal to or greater than 500 millimeters. In a case with the height of 500 millimeters or greater, the bicycle determination unit 162 may keep the three-dimensional object region 212 as the presumed bicycle. One reason for this may be to exclude, from the presumed bicycle, the small-height three-dimensional object 210 provided together with a road, e.g., a road shoulder.

Thereafter, the bicycle determination unit 162 may determine, as a fourth precondition (4), whether or not a rate of change of a current value to a previous value of the height of the three-dimensional object region 212 between frames, i.e., between a previous frame and a current frame, is equal to or lower than 10%. In a case where the rate of change is equal to or lower than 10%, the bicycle determination unit 162 may keep the three-dimensional object region 212 as the presumed bicycle.

Figure 6:
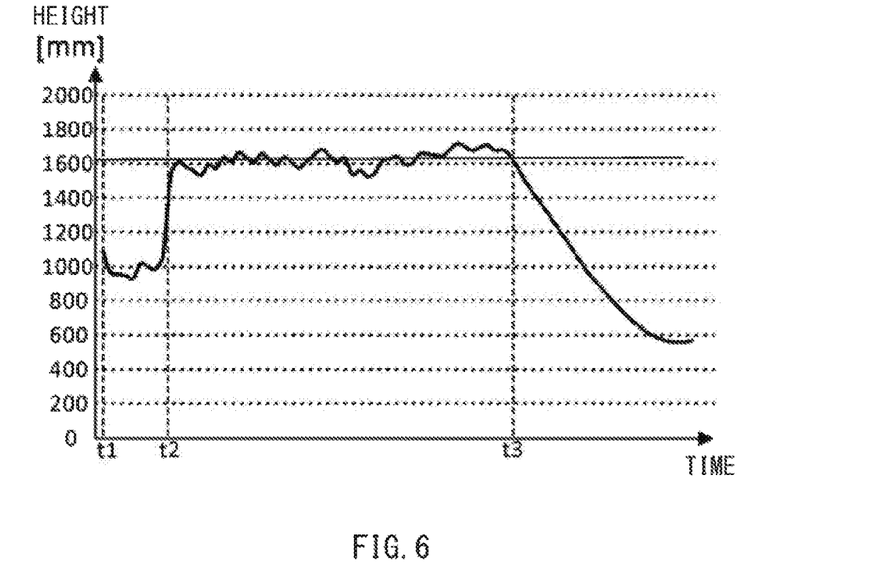
FIG. 6 describes an example of preconditions.

FIG. 6 illustrates the precondition. At timing t1 in FIG. 6, the front wheel appears in the luminance image 126 (refer to FIG. 5B). Thereupon, the three-dimensional object region 212 including the three-dimensional object 210 is formed, and the height of the three-dimensional object region 212 is, for example, 1000 millimeters. At timing t2 in FIG. 6, the rider appears in the luminance image 126 (refer to FIG. 5C). Thereupon, the height of the three-dimensional object region 212 changes stepwise from 1000 millimeters to 1600 millimeters. After the rider appears, the head of the rider determines the height of the three-dimensional object region 212. Accordingly, the height of the three-dimensional object region 212 barely changes, as denoted by a solid line in FIG. 6, with the rate of change falling within a range of 10% or lower, until timing t3 when the three-dimensional object 210 begins to exit the luminance image 126. In other words, the unchanging height of the three-dimensional object region 212 means that the rider has appeared. In this way, the rate of change makes it possible to identify the front wheel and the rider.

Thereafter, the bicycle determination unit 162 may determine, as a fifth precondition (5), whether or not a rate of change of a current value to a previous value of a width of the three-dimensional object region 212 between frames is equal to or higher than 20%. In a case where the rate of change is equal to or higher than 20%, the bicycle determination unit 162 may keep the three-dimensional object region 212 as the presumed bicycle.

Figure 7:
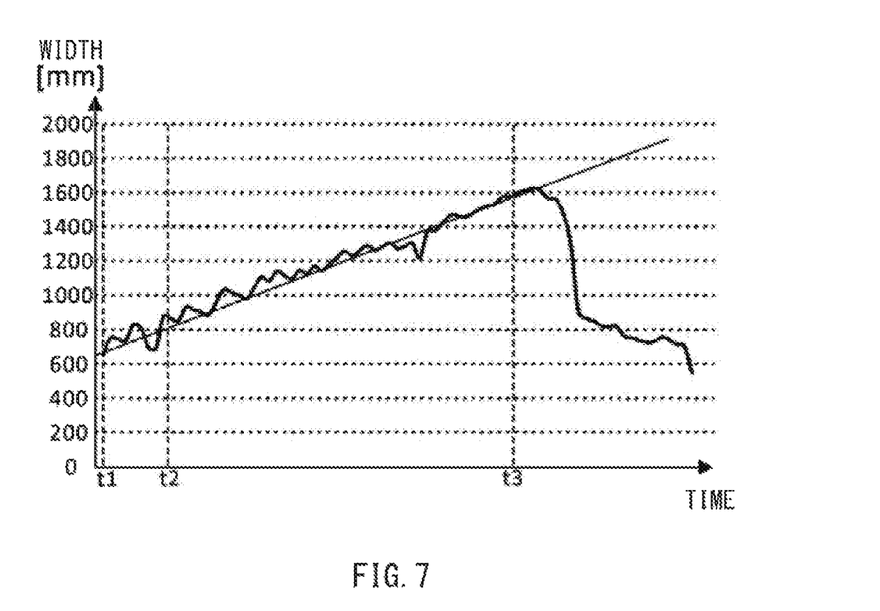
FIG. 7 describes an example of the preconditions.

FIG. 7 illustrates the precondition. Here, the aim is to identify a bicycle crossing the luminance image 126. First, only a part of the three-dimensional object 210 appears, and thereafter, the area of occupation becomes greater gradually. Accordingly, as illustrated in FIG. 7, the width of the three-dimensional object region 212 is supposed to become greater moment by moment, from the timing t1 when the front wheel appears in the luminance image 126. In a case where the width of the three-dimensional object region 212 makes transitions at the rate of change of 20% or higher, as denoted by a solid line in FIG. 7, the bicycle determination unit 162 may determine that the three-dimensional object 210 is crossing, at least, at a speed of 3 km/h or greater.

Here, the bicycle-likeliness is defined by the rate of change in the width of the three-dimensional object region 212, but this is non-limiting. Instead, or in addition, the bicycle-likeliness may be determined on the basis of a speed of the three-dimensional object region 212, or a speed of the three-dimensional object 210. For example, the bicycle determination unit 162 may determine, as a sixth precondition (6), whether or not the speed of the three-dimensional object region 212 between frames, i.e., between the previous frame and the current frame, is unchanged or devoid of hunting, and whether or not the speed is equal to or greater than 3 km/h. In a case where both conditions are satisfied, the bicycle determination unit 162 may keep the three-dimensional object region 212 as the presumed bicycle.

As described, the three-dimensional object region 212 satisfies the preconditions, and thereafter, the bicycle determination unit 162 may determine whether or not the conditions of accumulation are satisfied, to accumulate the points of the bicycle-likeliness.

In one example, the bicycle determination unit 162 may determine, as a first condition of accumulation (1), whether or not left or right side of the three-dimensional object region 212 is on an edge of the luminance image 126 or another three-dimensional object region including a three-dimensional object of a smaller relative distance than that of the three-dimensional object region 212. In a case where the first condition of accumulation (1) is satisfied, the bicycle determination unit 162 may accumulate the point of the bicycle-likeliness.

Figure 8A:
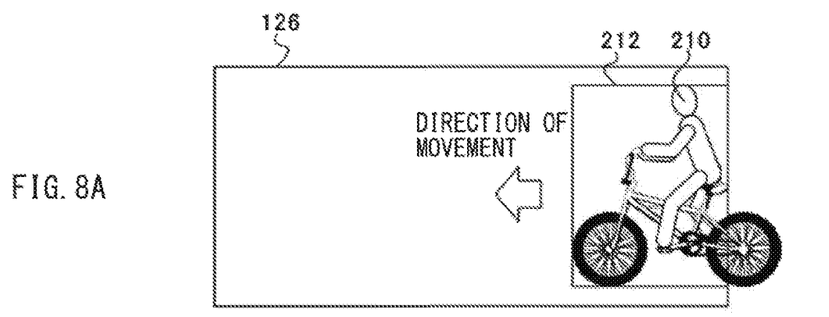
FIGS. 8A to 8D describe an example of conditions of accumulation.
Figure 8B:
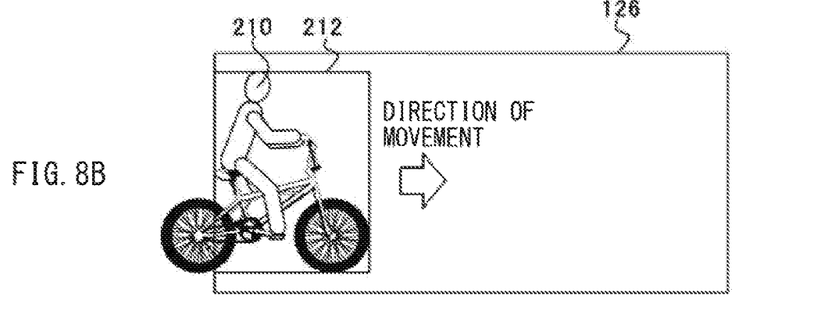

FIGS. 8A to 8D illustrate the condition of accumulation. For example, as illustrated in FIG. 8A, in a case where a bicycle is moving horizontally leftward from the edge of the luminance image 126, a part of the bicycle, e.g., a rear wheel in this example, is invisible because of limitation of an imaging range of the luminance image 126. Accordingly, the edge of the luminance image 126 is positioned horizontally rightward of, and is continuous with, the three-dimensional object region 212. As illustrated in FIG. 8B, in a case where a bicycle is moving horizontally rightward from the edge of the luminance image 126, as with the case of FIG. 8A, the edge of the luminance image 126 is positioned horizontally leftward of, and is continuous with, the three-dimensional object region 212.

Figure 8C:
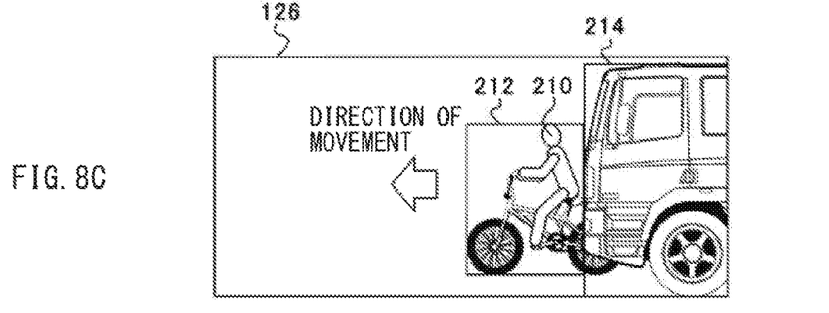
Figure 8D:
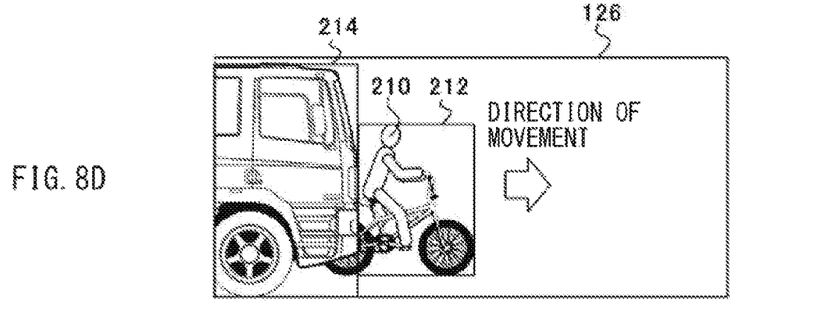

As illustrated in FIG. 8C, in a case where a bicycle is moving horizontally leftward, a part of the bicycle, e.g., a rear wheel in this example, may sometimes become invisible because of another three-dimensional object region 214. Such an invisible part is present hidden by the other three-dimensional object region 214, at a position where the relative distance of the three-dimensional object region 212 is greater than that of the other three-dimensional object region 214. In other words, the other three-dimensional object region 214 has the relative distance to the own vehicle 1 smaller than that of the three-dimensional object region 212, and the other three-dimensional object region 214 is positioned horizontally rightward of, and is continuous with, the three-dimensional object region 212. As illustrated in FIG. 8D, in a case where a bicycle is moving horizontally rightward, a part of the bicycle may become invisible because of the other three-dimensional object region 214. In this case, as with the case of FIG. 8C, the other three-dimensional object region 214 having the relative distance to the own vehicle 1 smaller than that of the three-dimensional object region 212 is positioned horizontally leftward of the three-dimensional object region 212. In this way, the bicycle determination unit 162 may determine whether or not the left or right side of the three-dimensional object region 212 is on the edge of the luminance image 126 or the other three-dimensional object region 214 having the relative distance to the own vehicle 1 shorter than that of the three-dimensional object region 212. This makes it possible to identify the three-dimensional object 210, as a bicycle part of which is invisible.

Thereafter, the bicycle determination unit 162 may equally divide the three-dimensional object region 212 into a plurality of divisions. For example, the bicycle determination unit 162 may equally divide the three-dimensional object region 212 into ten (10) vertically arranged divisions each of which is shaped of a laterally disposed strip.

The bicycle determination unit 162 may make determinations as to second to fifth conditions of accumulation (2) to (5), on the basis of a state of occupation of each of the plurality of the divisions by the three-dimensional object 210. Thus, the bicycle determination unit 162 may determine an appearance or disappearance, in the three-dimensional object region 210, of the front wheel and the rider of the bicycle, exclusive of the rear wheel.

Figure 9:
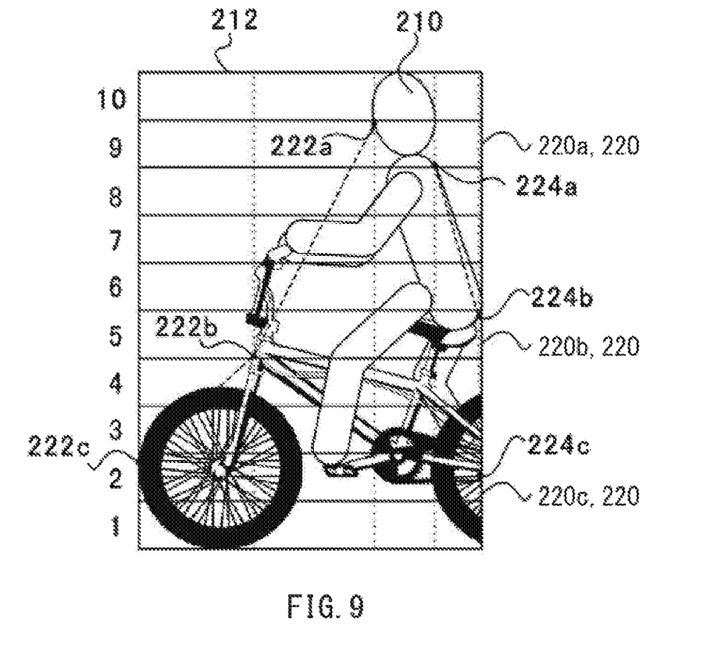
FIG. 9 describes an example of the conditions of accumulation.

FIG. 9 illustrates the condition of accumulation. The bicycle determination unit 162 may determine, as the second condition of accumulation (2), whether or not a rectangle formed by connecting left and right edges of the three-dimensional object 210 in a plurality of predetermined divisions 220 forms a trapezoid. In one embodiment of the technology, the plurality of the predetermined divisions 220 may serve as a "first division" and a "second division".

In one example, as illustrated in FIG. 9, the bicycle determination unit 162 may accumulate the point of the bicycle-likeliness, in a case where a left edge 222*b* of the three-dimensional object 210 in a rider body division 220*b* is positioned horizontally leftward of a left edge 222*a* of the three-dimensional object 210 in a rider head division 220*a*, and a right edge 224*b* of the three-dimensional object 210 in the rider body division 220*b* is positioned horizontally rightward of a right edge 224*a* of the three-dimensional object 210 in the rider head division 220*a*. The rider head division 220*a* is a division in the ninth place vertically from the bottom, out of the plurality of the divisions 220, and corresponds to the head of the rider. The rider body division 220*b* is a division in the fifth place from the bottom and corresponds to the body of the rider. The rider body division 220*b* is positioned vertically downward of the rider head division 220*a*.

Moreover, the bicycle determination unit 162 may accumulate the point of the bicycle-likeliness, in a case where a left edge 222*c* of the three-dimensional object 210 in a bicycle body division 220*c* is positioned horizontally leftward of the left edge 222*b* of the three-dimensional object 210 in the rider body division 220*b*, and a right edge 224*c* of the three-dimensional object 210 in the bicycle body division 220*c* is positioned horizontally rightward of the right edge 224*b* of the three-dimensional object 210 in the rider body division 220*b*. The rider body division 220*b* is the division in the fifth place from the bottom, out of the plurality of the divisions 220, and corresponds to the body of the rider. The bicycle body division 220*c* is a division in the second place from the bottom and corresponds to a main body of the bicycle. The bicycle body division 220*c* is positioned vertically downward of the rider body division 220*b*.

Figure 10:
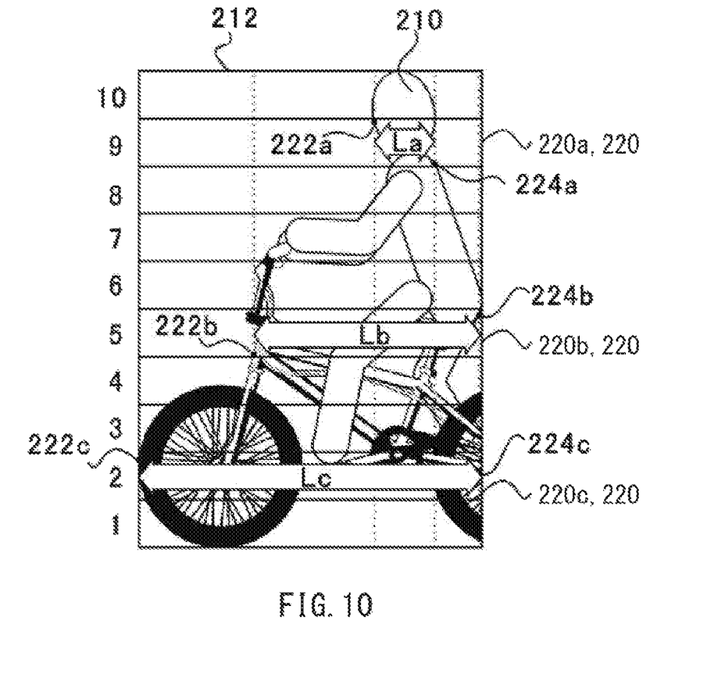
FIG. 10 describes an example of the conditions of accumulation.

FIG. 10 illustrates the condition of accumulation. The bicycle determination unit 162 may compare horizontal lengths of occupation of the plurality of the predetermined divisions 220 by the three-dimensional object 210, to determine, as the third condition of accumulation (3), whether or not the horizontal length of occupation of whichever division 220 is positioned vertically downward of the others is greater.

In one example, the bicycle determination unit 162 may accumulate the point of the bicycle-likeliness, in a case where a horizontal length Lb of occupation of the rider body division 220b by the three-dimensional object 210 is greater than a horizontal length La of occupation of the rider head division 220a by the three-dimensional object 210. The rider head division 220a is the division in the ninth place from the bottom, out of the plurality of the divisions 220, and corresponds to the head of the rider. The rider body division 220b is the division in the fifth place from the bottom and corresponds to the body of the rider. The rider body division 220b is positioned vertically downward of the rider head division 220a.

Moreover, the bicycle determination unit 162 may accumulate the point of the bicycle-likeliness, in a case where a horizontal length Lc of occupation of the bicycle body division 220c by the three-dimensional object 210 is greater than the horizontal length Lb of occupation of the rider body division 220b by the three-dimensional object 210. The rider body division 220b is the division in the fifth place from the bottom, out of the plurality of the divisions 220, and corresponds to the body of the rider. The bicycle body division 220c is the division in the second place from the bottom and corresponds to the main body of the bicycle. The bicycle body division 220c is positioned vertically downward of the rider body division 220b.

Thereafter, the bicycle determination unit 162 may determine, as the fourth condition of accumulation (4), whether or not the horizontal length La of occupation of the rider head division 220a by the three-dimensional object 210 is smaller than 500 mm. The rider head division 220a is the division in the ninth place from the bottom, out of the plurality of the divisions 220, and corresponds to the head of the rider. In a case where the horizontal length La of occupation is smaller than 500 mm, the bicycle determination unit 162 may accumulate the point of the bicycle-likeliness. One reason for this is that the human head is never equal to or greater than 500 mm in horizontal length.

Thereafter, the bicycle determination unit 162 may accumulate the point of the bicycle-likeliness, in a case where, as the fifth condition of accumulation, the horizontal length Lc of occupation of the bicycle body division 220c by the three-dimensional object 210 is equal to or greater than three times the horizontal length La of occupation of the rider head division 220a by the three-dimensional object 210. One reason for this setting is relation between the human head and the main body of the bicycle. The bicycle body division 220c is the division in the second place from the bottom, out of the plurality of the divisions 220, and corresponds to the main body of the bicycle. The rider head division 220a is the division in the ninth place from the bottom and corresponds to the head of the rider.

In addition to the forgoing first to fifth conditions of accumulation (1) to (5), other various conditions may be provided, to determine the appearance or disappearance, in the three-dimensional object region 210, of the front wheel and the rider of the bicycle, exclusive of the rear wheel. Non-limiting examples may include shape-matching between a general bicycle shape and the three-dimensional object 210.

(Bicycle Identification Process S204)

The bicycle identification unit 164 may identify, as a bicycle (to be accurate, a bicycle a person is riding), whichever three-dimensional object 210 in the three-dimensional object region 212 satisfies the preconditions and has the greater number of the points than a threshold. The points are accumulated on the basis of the conditions of accumulation. In other words, the bicycle identification unit 164 identify such a three-dimensional object 210, as highly likely a bicycle. Whether or not the three-dimensional object 210 satisfies the preconditions is determined by the bicycle determination unit 162. It is to be noted that in the forgoing, the number of times the three-dimensional object 210 satisfies the forgoing condition is not limited to once. Alternatively, the bicycle identification unit 164 may identify, as a bicycle, whichever three-dimensional object 210 in the three-dimensional object region 212 satisfies, consecutively in the predetermined number of frames, e.g., in two frames, the preconditions and has the greater number of the points than the threshold. The points are accumulated on the basis of the conditions of accumulation.

(Speed Identification Process S206)

Figure 11:
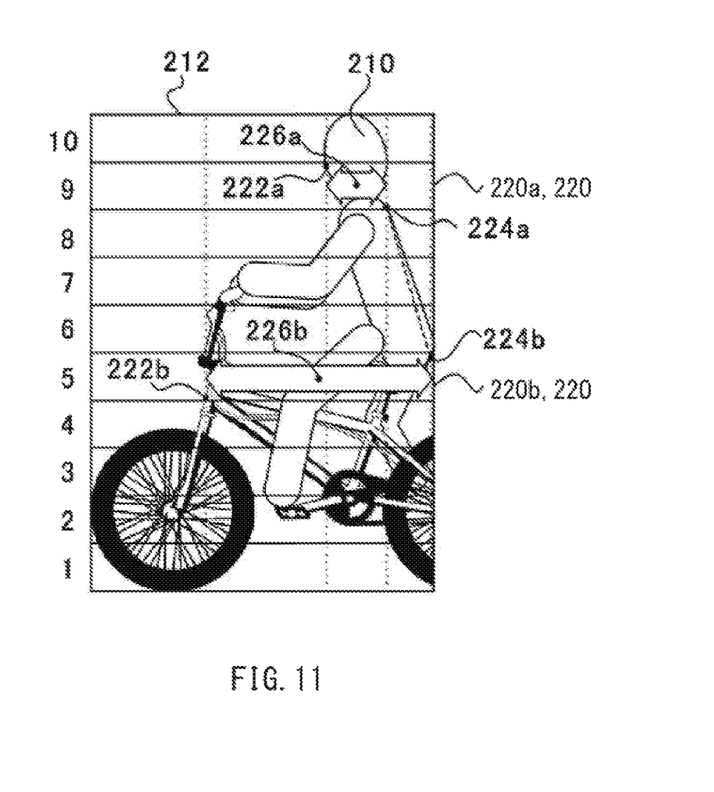
FIG. 11 describes an example of a speed identification process.

FIG. 11 illustrates the speed identification process. The speed identification unit 166 may identify the speed of the three-dimensional object 210 on the basis of the state of occupation of the divisions 220 by the three-dimensional object 210. The divisions 220 may be generated by the bicycle determination unit 162. In one example, the speed identification unit 166 may derive the speed of the three-dimensional object region 212 on the basis of an amount of movement of a reference position. The reference position may be a horizontal midpoint 226a of the three-dimensional object 210 in the rider head division 220a, or a horizontal midpoint 226b of the three-dimensional object 210 in the rider body division 220b, or an average position of both. The rider head division 220a is the division in the ninth place from the bottom and corresponds to the head of the rider. The rider body division 220b is the division in the fifth place from the bottom and corresponds to the body of the rider.

The width of the three-dimensional object region 212 for the bicycle crossing the luminance image 126 becomes gradually greater. Thus, a horizontal midpoint of the three-dimensional object region 212 itself moves in a direction in which the width of the three-dimensional object region 212 becomes greater, that is, opposite to the direction of movement of the three-dimensional object 210. It follows, therefore, that a speed of the horizontal midpoint of the three-dimensional object region 212 becomes lower than an actual speed of the bicycle. In this example, the target is not the horizontal width of the three-dimensional object region 212 but the head or the body of the rider positioned stably in the three-dimensional object region 212. Hence, it is possible to accurately derive the speed of the bicycle.

In this example, description is made by giving the example where the speed of the three-dimensional object region 212 is obtained on the basis of the horizontal midpoints 226a and 226b of the three-dimensional object 210 in the rider head division 220a and the rider body division 220b. However, this is non-limiting. For example, a horizontal midpoint of the three-dimensional object 210 in whichever division corresponds to any part of the rider may be used. Non-limiting example may include a horizontal midpoint of the three-dimensional object 210 in a rider body division in the fourth place from the bottom corresponding to the body of the rider.

With the three-dimensional object 210 being identified as a bicycle in this way, the vehicle exterior environment recognition apparatus 120 may execute the collision avoidance control aimed at the bicycle, to avoid a collision with the bicycle as the three-dimensional object 210.

There are also provided a program that causes a computer to serve as the vehicle exterior environment recognition apparatus 120, and a computer-readable recording medium that holds the program. Non-limiting examples of the recording medium may include a flexible disk, a magneto-optical disk, a ROM, a CD (compact disk), a DVD (digital versatile disk), and a BD (blue ray disk). Here, the program means a data processor described in any language or description method.

Although some preferred but non-limiting embodiments of the technology are described above by way of example with reference to the accompanying drawings, the technology is by no means limited to the embodiments described above. It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

For example, in the forgoing embodiments, description is made by giving the example where the three-dimensional object region 212 is equally divided into ten (10) divisions to generate the divisions 220. However, the number of the divisions may be set to any number. In the forgoing embodiments, the processing assumes that the rider's head is positioned in the division in the ninth place from the bottom, that the rider's body is positioned in the fifth place from the bottom, and that the main body of the bicycle is positioned in the second place from the bottom. However, such assumption may be changed in accordance with actual situations. Moreover, the divisions may be set regarding other parts of the rider or the bicycle.

In the forgoing embodiments, description is made by giving the example where the determination as to whether or not the conditions of accumulation are satisfied is made to accumulate the points of the bicycle-likeliness, in the limited case where the three-dimensional object region 212 satisfies the preconditions. However, this is non-limiting. In one alternative, the preconditions may be also digitized into points, to determine the bicycle-likeliness solely on the basis of the accumulated points.

It is to be noted that processes of the vehicle exterior environment recognition processing herein do not have to be processed in the order described in the flowchart, but may include parallel processing or sub-routine processing.

According to the embodiments of the technology, it is possible to quickly and accurately detect a specific object such as a bicycle.

The vehicle exterior environment recognition apparatus 120 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle exterior environment recognition apparatus 120. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the vehicle exterior environment recognition apparatus 120 illustrated in FIG. 1.

The invention claimed is:

1. A vehicle exterior environment recognition apparatus, comprising:
a three-dimensional object region identification unit configured to identify a three-dimensional object region in each of distance images, the three-dimensional object region being formed to surround a three-dimensional object in the distance image such that the three-dimensional object region is defined by two vertically extending lines that respectively meet left and right edges of the three-dimensional object and two horizontally extending lines that respectively meet upper and lower edges of the three-dimensional object;
a bicycle determination unit configured to:
determine that (i) a first rate of change between a height of the three-dimensional object region in a first distance image of the distance images and a height of the three-dimensional object region in a second distance image of the distance images is equal to or less than a first value, and (ii) a second rate of change between a width of the three-dimensional object region in the first distance image and a width of the three-dimensional object region in the second distance image is equal to or greater than a second value;
in response to determining that (i) the first rate is equal to or less than the first value, and (ii) that second rate is equal to or greater than the second value, divide the three-dimensional object region into three or more divisions including a first division and a second division positioned vertically downward of the first division; and
identify (i) a first part of the three-dimensional object in the first division, and left and right edges of the first part of the three-dimensional object, and (ii) a second part of the three-dimensional object in the second division, and left and right edges of the second part of the three-dimensional object; and
a bicycle identification unit configured to:
determine that (i) the left edge of the second part of the three-dimensional object in the second division is positioned horizontally leftward of the left edge of the first part of the three-dimensional object in the first division, and (ii) the right edge of the second part of the three-dimensional object in the second division is positioned horizontally rightward of the right edge of the first part of the three-dimensional object in the first division; and
in response to determining that (i) the left edge of the second part is positioned horizontally leftward of the left edge of the first part, and (ii) the right edge of the second part is positioned horizontally rightward of the right edge of the first part, determine that the three-dimensional object is bicycle-likely
wherein the bicycle determination unit is configured to determine that the three-dimensional object is bicycle-likely on a condition that the left edge of the second part of the three-dimensional object in the second division is positioned horizontally leftward of the left edge of the first part of the three-dimensional object in the first division, and that the right edge of the second part of the three-dimensional object in the second division is positioned horizontally rightward of the right edge of the first part of the three-dimensional object in the first division.

2. The vehicle exterior environment recognition apparatus according to claim 1, wherein the bicycle determination unit is configured to determine the bicycle-likeliness on a basis of an appearance or disappearance, in the three-dimensional object region, of a front wheel of the bicycle and a rider of the bicycle, exclusive of a rear wheel of the bicycle.

3. The vehicle exterior environment recognition apparatus according to claim 1, wherein
the first division is a rider head division and the second division is a rider body division, the rider head division corresponding to a head of a rider of the bicycle, and the rider body division corresponding to a body of the rider of the bicycle, and
the bicycle determination unit is configured to determine that the three-dimensional object is bicycle-likely, on a condition that a horizontal length of occupation of the rider body division by the three-dimensional object is greater than a horizontal length of occupation of the rider head division by the three-dimensional object.

4. The vehicle exterior environment recognition apparatus according to claim 2, wherein
the first division is a rider head division and the second division is a rider body division, the rider head division corresponding to a head of a rider of the bicycle, and the rider body division corresponding to a body of the rider of the bicycle, and
the bicycle determination unit is configured to determine that the three-dimensional object is bicycle-likely, on a condition that a horizontal length of occupation of the rider body division by the three-dimensional object is greater than a horizontal length of occupation of the rider head division by the three-dimensional object.

5. The vehicle exterior environment recognition apparatus according to claim 1, wherein
the first division is a rider body division and the second division is a bicycle body division, the rider body division corresponding to a body of the rider of the bicycle, and the bicycle body division corresponding to a main body of the bicycle, and
the bicycle determination unit is configured to determine that the three-dimensional object is bicycle-likely, on a condition that a horizontal length of occupation of the bicycle body division by the three-dimensional object is greater than a horizontal length of occupation of the rider body division by the three-dimensional object.

6. The vehicle exterior environment recognition apparatus according to claim 2, wherein
the first division is a rider body division and the second division is a bicycle body division, the rider body division corresponding to a body of the rider of the bicycle, and the bicycle body division corresponding to a main body of the bicycle, and
the bicycle determination unit is configured to determine that the three-dimensional object is bicycle-likely, on a condition that a horizontal length of occupation of the bicycle body division by the three-dimensional object is greater than a horizontal length of occupation of the rider body division by the three-dimensional object.

7. A vehicle exterior environment recognition apparatus, comprising circuitry configured to:
identify a three-dimensional object region in distance images, the three-dimensional object region being formed to surround a three-dimensional object in the distance image such that the three-dimensional object region is defined by two vertically extending lines that respectively meet left and right edges of the three-dimensional object and two horizontally extending lines that respectively meet upper and lower edges of the three-dimensional object;
determine that (i) a first rate of change between a height of the three-dimensional object region in a first distance image of the distance images and a height of the three-dimensional object region in a second distance image of the distance images is equal to or less than a first value, and (ii) a second rate of change between a width of the three-dimensional object region in the first distance image and a width of the three-dimensional object region in the second distance image is equal to or greater than a second value;
in response to determining that (i) the first rate is equal to or less than the first value, and (ii) that second rate is equal to or greater than the second value, divide the three-dimensional object region into three or more divisions including a first division and a second division positioned vertically downward of the first division; and
identify (i) a first part of the three-dimensional object in the first division, and left and right edges of the first part of the three-dimensional object, and (ii) a second part of the three-dimensional object in the second division, and left and right edges of the second part of the three-dimensional object;
determine that (i) the left edge of the second part of the three-dimensional object in the second division is positioned horizontally leftward of the left edge of the first part of the three-dimensional object in the first division, and (ii) the right edge of the second part of the three-dimensional object in the second division is positioned horizontally rightward of the right edge of the first part of the three-dimensional object in the first division; and
in response to determining that (i) the left edge of the second part is positioned horizontally leftward of the left edge of the first part, and (ii) the right edge of the second part is positioned horizontally rightward of the right edge of the first part, determine that the three-dimensional object is bicycle-likely.

8. The vehicle exterior environment recognition apparatus according to claim 1, further comprising a speed identification unit configured to identify a speed of the three-dimensional object based on an amount of movement between i) a first midpoint between the left edge and the right edge of the three-dimensional object in the first division in the first distance image and ii) a second midpoint between the left edge and the right edge of the three-dimensional object in the first division in the second distance image.

9. The vehicle exterior environment recognition apparatus according to claim 7, wherein the circuitry is configured to identify a speed of the three-dimensional object based on an amount of movement between i) a first midpoint between the left edge and the right edge of the three-dimensional object in the first division in the first distance image and ii) a second midpoint between the left edge and the right edge of the three-dimensional object in the first division in the second distance image.

* * * * *